United States Patent
Yin (10) Patent No.: US 10,834,293 B2
(45) Date of Patent: Nov. 10, 2020

(54) IMAGE PROCESSING DEVICE, STORAGE MEDIUM, DISPLAY APPARATUS AND IMAGE PROCESSING METHOD

(71) Applicant: BOE TECHNOLOGY GROUP CO., LTD., Beijing (CN)

(72) Inventor: Xinshe Yin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/135,394

(22) Filed: Sep. 19, 2018

(65) Prior Publication Data

US 2019/0208086 A1 Jul. 4, 2019

(30) Foreign Application Priority Data

Jan. 2, 2018 (CN) .......................... 2018 1 0002085

(51) Int. Cl.
*H04N 1/60* (2006.01)
*H04N 9/67* (2006.01)
*G09G 5/02* (2006.01)
*H04N 9/64* (2006.01)

(52) U.S. Cl.
CPC ......... *H04N 1/6066* (2013.01); *H04N 1/6008* (2013.01); *H04N 9/67* (2013.01); *G09G 5/02* (2013.01); *H04N 9/64* (2013.01)

(58) Field of Classification Search
None
See application file for complete search history.

(56) References Cited

U.S. PATENT DOCUMENTS

| | | | |
|---|---|---|---|
| 2005/0031199 A1* | 2/2005 | Ben-Chorin | G09G 5/02 382/162 |
| 2005/0099426 A1 | 5/2005 | Primerano et al. | |
| 2007/0139449 A1 | 6/2007 | Bergquist et al. | |
| 2009/0109234 A1 | 4/2009 | Lee et al. | |
| 2009/0284554 A1* | 11/2009 | Doser | G09G 5/02 345/690 |
| 2011/0050695 A1* | 3/2011 | Sullivan | G06T 11/001 345/426 |
| 2011/0157212 A1 | 6/2011 | Zhang et al. | |

(Continued)

FOREIGN PATENT DOCUMENTS

| | | |
|---|---|---|
| CN | 1857396 A | 12/2006 |
| CN | 1897713 A | 1/2007 |

(Continued)

OTHER PUBLICATIONS

Chinese Office Action in corresponding Chinese Application No. 201810002085.5 dated May 31, 2019 (an English translation attached hereto). 15 pages.

*Primary Examiner* — YuJang Tswei
(74) *Attorney, Agent, or Firm* — Leason Ellis LLP (57) ABSTRACT

An image processing device and method for a display device are disclosed, and the image processing device includes a color gamut conversion unit; the color gamut conversion unit is configured to perform processing on an input signal inputted into the display device to allow a display operation according to a color gamut range of the display device to be converted into a display operation according to a color gamut range of the input signal when the display device displays the input signal.

14 Claims, 7 Drawing Sheets

(56) References Cited

U.S. PATENT DOCUMENTS

| | | | |
|---|---|---|---|
| 2013/0294689 A1* | 11/2013 | Jia | H04N 19/169 |
| | | | 382/166 |
| 2015/0237320 A1* | 8/2015 | Takahashi | H04N 5/265 |
| | | | 348/708 |
| 2017/0069244 A1* | 3/2017 | Lim | G09G 3/2003 |

FOREIGN PATENT DOCUMENTS

| | | |
|---|---|---|
| CN | 102110429 A | 6/2011 |
| CN | 102761749 A | 10/2012 |
| CN | 107527333 A | 12/2017 |

\* cited by examiner

IMAGE PROCESSING DEVICE, STORAGE MEDIUM, DISPLAY APPARATUS AND IMAGE PROCESSING METHOD

CROSS-REFERENCE TO RELATED APPLICATION

The application claims priority to the Chinese patent application No. 201810002085.5, filed Jan. 2, 2018, the entire disclosure of which is incorporated herein by reference as part of the present application.

TECHNICAL FIELD

The embodiments of the present disclosure relate to an image processing device, a storage medium, a display apparatus, and an image processing method.

BACKGROUND

In the field of display technology, the color gamut of the displayed color of a display device is generally represented by the area ratio of a triangle formed by three sub-pixels of red, green and blue displayed by the display device in the 1931 CIE-Yxy standard chromaticity diagram to a triangle in the NTSC standard (abbreviated as "NTSC ratio") on the basis of a triangle formed on the 1931 CIE-Yxy standard chromaticity diagram by the three primary colors—red, green and blue—of the standard form specified by the National Television Standards Committee (NTSC).

After a display device has been manufactured, the color gamut of the display device is fixed. The display device usually needs to obtain original image data from an external data source during display operation. In general, the color gamut of the original image data obtained from the external data source is different from the color gamut of the display device. Therefore, if the original image data is not processed, the display device cannot realize correct color reproduction of the original image, and therefore color representation by the display device is very different from the color representation of the original image.

SUMMARY

An embodiment of the present disclosure provides an image processing device for a display device, comprising a color gamut conversion unit; the color gamut conversion unit is configured to perform processing on an input signal inputted into the display device to allow a display operation according to a color gamut range of the display device to be converted into a display operation according to a color gamut range of the input signal when the display device displays the input signal.

In an example, the image processing device further comprises: a first gamma correction unit and a denormalizing unit, wherein the color gamut conversion unit is further configured to receive display signal data obtained from the input signal and output transformed signal data by normalization and second gamma correction; the first gamma correction unit is configured to obtain transformed signal normalized data by first gamma correction, which is inverse correction of second gamma correction, on the transformed signal data; and the denormalizing unit is configured to obtain transformed signal gamma data by denormalization, which is inverse correction of the normalization, of the transformed signal normalized data, and transmit the transformed signal gamma data to the display device for display.

In an example, the image processing device further comprises: a second gamma correction unit, wherein the second gamma correction unit is configured to obtain the display signal data by the second gamma correction on display signal normalized data obtained from the input signal by the normalization; and a gamma value of the second gamma correction and a gamma value of the first gamma correction are mutually reciprocal.

In an example, in the image processing device, the gamma value of the second gamma correction is 2.2.

In an example, the image processing device further comprises: a normalizing unit, wherein the normalizing unit is configured to obtain the display signal normalized data by the normalization on display signal gamma data as the input signal inputted into the image processing device.

In an example, in the image processing device, the color gamut conversion unit is configured to adopt a color gamut conversion matrix to realize color gamut conversion, and the color gamut conversion matrix is as follows:

$$[M]=[AS]\cdot[KS]\cdot[KP]^{-1}\cdot[AP]^{-1}$$

in which [M] refers to the color gamut conversion matrix; [AS] refers to a transformation matrix for converting tristimulus values of the transformed signal data into corresponding chromaticity coordinate values; [KS] refers to a coefficient matrix for normalizing the tristimulus values of the transformed signal data; [AP] refers to a transformation matrix for converting tristimulus values of the display signal data into corresponding chromaticity coordinate values; and [KP] refers to a coefficient matrix for normalizing the tristimulus values of the display signal data.

In an example, in the image processing device, the color gamut conversion unit is further configured to obtain the color gamut conversion matrix by following operations: obtaining a relational equation between the chromaticity coordinate values of the display signal data and the tristimulus values of the display signal data; obtaining a relational equation between the chromaticity coordinate values of the transformed signal data and the tristimulus values of the transformed signal data; and allowing the tristimulus values of the display signal data to be equal to the tristimulus values of the transformed signal data.

In an example, the image processing device further comprises a storage unit, wherein the color gamut conversion matrix is stored in the storage unit.

In an example, in the image processing device, the color gamut range of the input signal is standard color gamut; and the standard color gamut includes sRGB color gamut, adobe RGB color gamut or P3 color gamut.

Another embodiment of the present disclosure provides an image processing method, comprising: performing processing on an input signal inputted into a display device so as to convert a display operation according to a color gamut range of the display device into a display operation according to a color gamut range of the input signal when the display device displays the input signal.

In an example, the image processing method further comprises: obtaining transformed signal data by color gamut conversion on the display signal data obtained from the input signal by normalization and second gamma correction; obtaining transformed signal normalized data by first gamma correction, which is inverse correction of the second gamma correction, of the transformed signal data; and obtaining transformed signal gamma data by denormalization, which is inverse transformation of the normalization, of the transformed signal normalized data, and transmitting the transformed signal gamma data to the display device for display.

In an example, the image processing method further comprises: obtaining the display signal data by the second gamma correction on display signal normalized data obtained from the input signal by the normalization, wherein a gamma value of the second gamma correction and a gamma value of the first gamma correction are mutually reciprocal.

In an example, in the image processing method, the gamma value of the second gamma correction is 2.2.

In an example, the image processing method further comprises: obtaining the display signal normalized data by the normalization on display signal gamma data which are inputted into the display device as the input signal.

In an example, in the image processing method, the color gamut conversion is realized by color gamut conversion matrix, and the color gamut conversion matrix is as follows:

$$[M]=[AS]\cdot[KS]\cdot[KP]^{-1}\cdot[AP]^{-1}$$

in which [M] refers to the color gamut conversion matrix; [AS] refers to a transformation matrix for converting tristimulus values of the transformed signal data into corresponding chromaticity coordinate values; [KS] refers to a coefficient matrix for normalizing the tristimulus values of the transformed signal data; [AP] refers to a transformation matrix for converting tristimulus values of the display signal data into corresponding chromaticity coordinate values; and [KP] refers to a coefficient matrix for normalizing the tristimulus values of the display signal data.

In an example, in the image processing method, the color gamut conversion matrix is obtained by the following operations: obtaining a relational equation between the chromaticity coordinate values of the display signal data and the tristimulus values of the display signal data; obtaining a relational equation between the chromaticity coordinate values of the transformed signal data and the tristimulus values of the transformed signal data; and allowing the tristimulus values of the display signal data to be equal to the tristimulus values of the transformed signal data.

In an example, the image processing method further comprises: determining whether the color gamut range of the display device is greater than the color gamut range of the input signal, and executing the color gamut conversion in a case where the color gamut range of the display device is greater than the color gamut range of the input signal.

Still another embodiment of the present disclosure provides a storage medium, wherein computer instructions that are capable to be executed by a processor are stored on the storage medium; and any above image processing method is implemented when the computer instructions are executed by the processor.

Further still another embodiment of the present disclosure provides an image processing device, comprising a processor and a storage medium, wherein computer instructions that are capable to be executed by the processor are stored on the storage medium; and any above image processing method is implemented when the computer instructions are executed by the processor.

Another embodiment of the present disclosure provides a display apparatus, comprising any above image processing device and a display device, wherein the display device is configured to receive a processing result outputted by the image processing device for display.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left"

and the like are only used to indicate relative position relationship, and when the position of the object which is described is changed, the relative position relationship may be changed accordingly.

Figure 1:
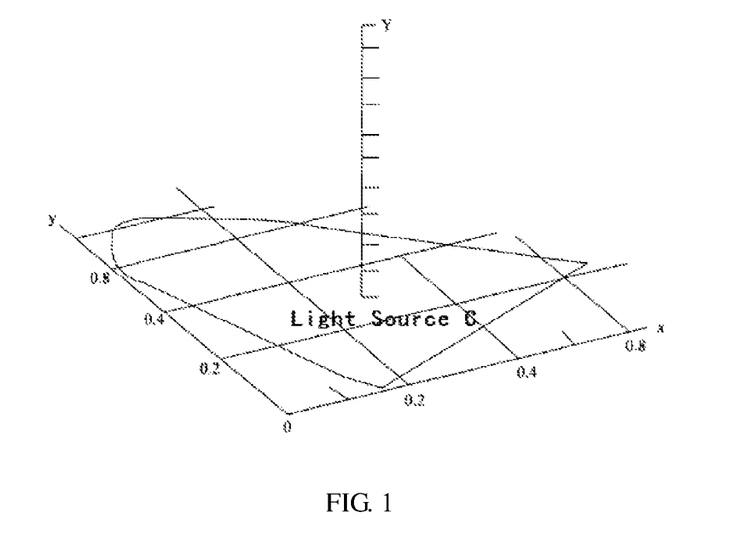
FIG. 1 is the 1931 CIE-Yxy standard chromatic diagram.

FIG. 1 is a 1931 CIE-Yxy standard chromaticity diagram, in which the brightness parameter Y and the color coordinate (x, y) are adopted for color description. As shown in FIG. 1, in the 1931 CIE-Yxy standard chromaticity diagram, the x-axis chromaticity coordinate is equivalent to the proportion of the red primary color component; the y-axis chromaticity coordinate is equivalent to the proportion of the green primary color component; and the Y axis is perpendicular to a plane defined by the xy-chromaticity-coordinates and represents the brightness of color. On the Y axis, grayscale is adopted to represent the level of brightness. The grayscale represents the level of different brightness from the darkest to the brightest. The more the levels of grayscales displayed by the Y axis, the more delicate the image effect it can present. For instance, an 8-bit display device can represent the brightness levels of the eighth power of 2, namely 256, which may be referred to as 256 grayscale levels. Each pixel on a screen of the display device combines light of red, green and blue in different brightness levels to finally form a point in different colors as required. That is to say, the color change of each point on the screen is actually formed by the grayscale change of RGB three sub-pixels for forming this point.

Figure 2:
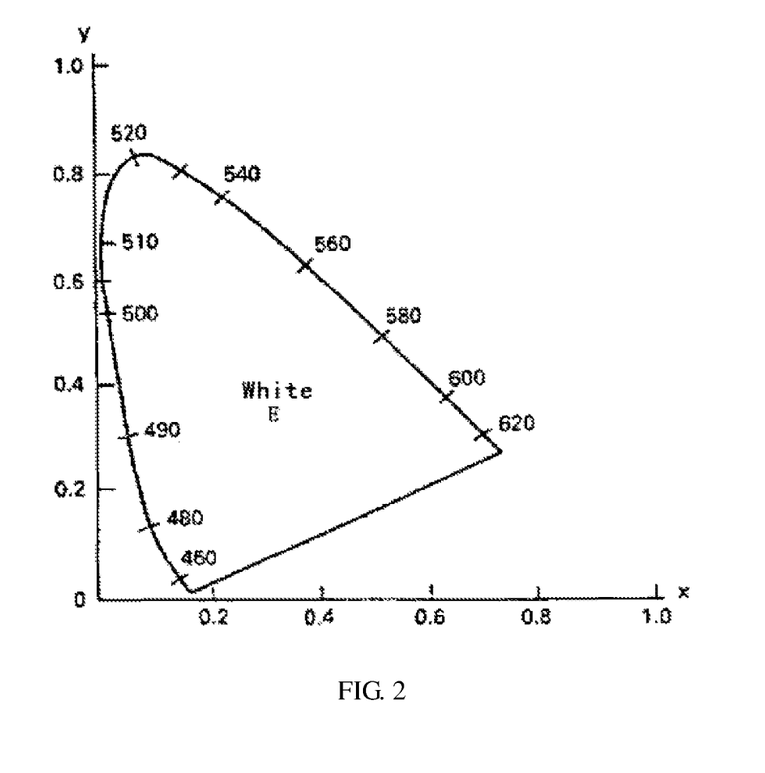
FIG. 2 is a two-dimensional (2D) plane chromaticity diagram of the 1931 CIE-Yxy standard chromatic diagram.

FIG. 2 is a 2D plane chromaticity diagram of the 1931 CIE-Yxy standard chromaticity diagram, in which the Y-axis coordinate representing the brightness is omitted. Point E as shown in FIG. 2 represents a white-light point, and the xy-chromaticity-coordinate of point E is (0.33, 0.33); and the color that surrounds the edge of the color space (namely the U-shaped edge as shown in FIG. 2) is the spectral color. The saturation ratio of the white-light point E in the center is the lowest; the saturation ratio on the spectral locus is the highest; the boundary of the spectral locus represents the maximum saturation of the spectral color; the number on the boundary represents the wavelength of the spectral color; and the outline of the spectral locus contains all the perceptive tones. All the monochromatic light is disposed on the U-shaped spectral locus curve, and the curve is a monochromatic locus. Various kinds of true colors in nature are within the closed curve. Physical three primary colors selected in the RGB system are on the U-shaped curve of the chromaticity diagram.

For instance, with respect to a display device, chromaticity points of RGB sub-pixels in the 1931 CIE-Yxy standard chromaticity diagram are respectively $(x_R, y_R)$, $(x_G, y_G)$ and $(x_B, y_B)$, the color gamut of which is represented by the area of a triangle encircled by the three points of the RGB three sub-pixels on the 1931 CIE-Yxy chromaticity diagram. That is to say, when the area of the triangle is larger, the color range that the display device can display is wider, namely the color gamut range of the display device is larger.

For instance, along with the rapid development of the technology of medical digital imaging equipment in the medical field, e.g., digital radiography (DR), computer radiography (CR), computed tomography (CT) and 3D image, image diagnosis is implemented from the traditional hard-reading (i.e., reading real films) to soft-reading pictures (i.e., reading images on a display). Medical display has replaced real films as the main tool for image diagnosis. The medical display, taken as a special display in the medical field, must satisfy the requirements of consistency and integrity of the display. Consistency requires that the display quality (brightness, grayscale, contrast, etc.) of the same image is kept stable, i.e., the same after the medical display is used for different time periods. Integrity requires that the display quality (brightness, grayscale, contrast, etc.) of the same image when displayed on medical displays at different sites of a hospital is also the same, so the image viewed by the doctors at different sites can be provided with the same information, and hence misdiagnosis and misjudgment caused by different image display qualities can be avoided.

Moreover, for instance, during minimally invasive endoscopic surgery, as the doctor in operation cannot directly see the surgical point through his/her eyes but operates by observing the image of the medical display, it is required that the image color displayed by the medical display must fully restore the true color of the human tissue structure, that is, the viewed image color is the same as the color of the actual tissue structure, so the misdiagnosis and misjudgment of the doctors can be reduced.

Figure 3:
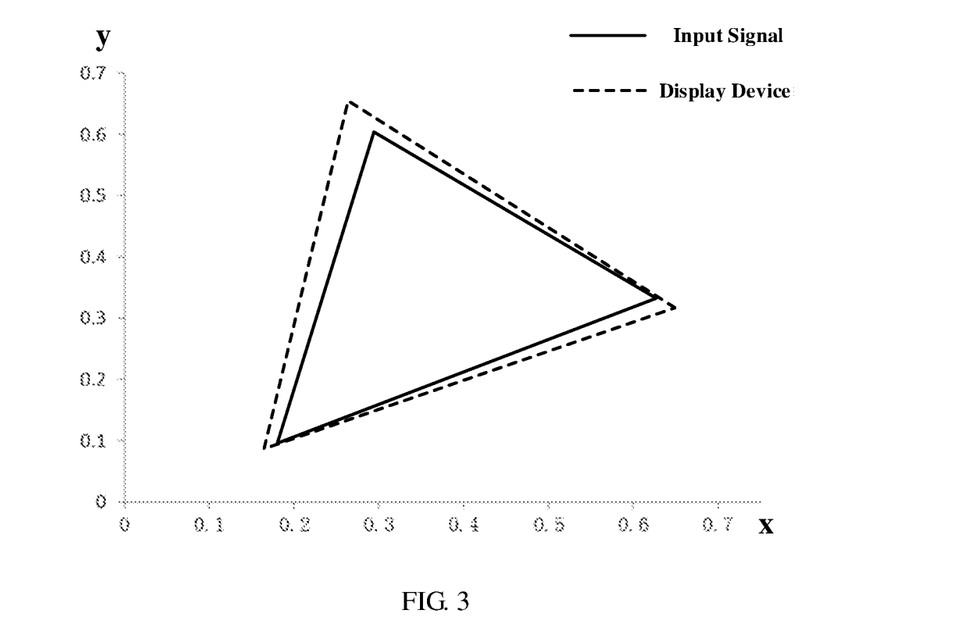
FIG. 3 is a 2D plane chromaticity diagram illustrating the color gamut range displayed by a display device and the color gamut range of an input signal inputted into the display device.

For instance, as shown in FIG. 3, in an example, a triangle encircled by dotted lines represents the color gamut range displayed by a display device, and a triangle encircled by solid lines represents the color gamut range of an input signal inputted into the display device. For instance, the color gamut of the input signal is sRGB standard color gamut. As can be seen from FIG. 3, the color gamut range of the display device covers the color gamut range of the input signal (e.g., the color gamut range by which the input signal is produced by an image taking device) and is larger than the color gamut range of the input signal, namely the display device can display more colors. For instance, if the color gamut range displayed by the display device is not subjected to color gamut conversion, the display device cannot perform accurate color reproduction of the originally inputted input signal, so the displayed colors become greatly different, and different display devices bring about different color reproduction.

For instance, the display device as shown in FIG. 3 may be a medical display. If color gamut conversion is not performed, the medical display cannot accurately realize color reproduction. For instance, when a doctor uses the medical display for surgery, the observed color of the blood vessels becomes redder, which may cause visual discomfort to the doctor. In severe cases, the surgical process may be affected.

At least one embodiment of the present disclosure provides an image processing device, which is applied to a display device and comprises a color gamut conversion unit. The color gamut conversion unit is configured to perform processing on the input signal inputted into the display device, so that the display operation according to the color gamut range of the display device can be converted into the display operation according to the color gamut range of the input signal when the display device displays the input signal.

At least one embodiment of the present disclosure further provides a storage medium, a display device and an image processing method.

The image processing device, the storage medium, the display device and the image processing method, provided by the embodiments of the present disclosure, can restore the color displayed by the display device to the original color of the input signal (i.e., input signal of an image to be displayed), and then can display the true color of the image.

Detailed description will be given below to the embodiments of the present disclosure with reference to the accompanying drawings.

Figure 5:
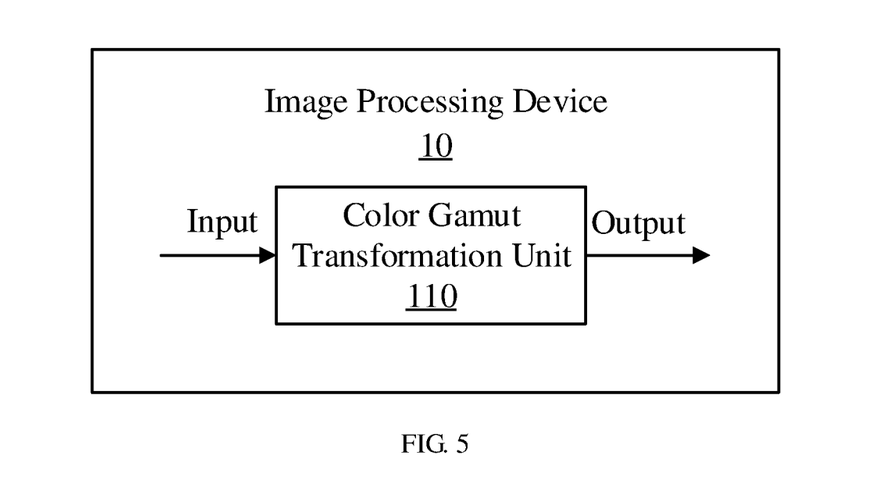
FIG. 5 is a schematic diagram of an image processing device provided by an example in an embodiment of the present disclosure.

An example of an embodiment of the present disclosure provides an image processing device 10. As shown in FIG.

5, the image processing device 10 is applied to a display device and comprises a color gamut conversion unit 110. The color gamut conversion unit 110 is configured to perform processing on an input signal inputted into the display device, so that the display operation according to the color gamut range of the display device can be converted into the display operation according to the color gamut range of the input signal when the display device displays the input signal. For instance, the input signal inputted into the display device can be inputted into the color gamut conversion unit 110 for color gamut conversion at first, and then the outputted signal is inputted into the display device for display.

It should be noted that in the embodiment of the present disclosure, the input signal inputted into the display device may be in various forms. For instance, the input signal may include grayscale voltage data for display directly provided for the display device. For instance, the grayscale voltage data is display signal gamma data containing gamma correction information. In this case, the display signal gamma data can be first processed by normalization and gamma correction to obtain display signal data, and then the display signal data is further processed by the color gamut conversion unit 110. In another example, the input signal can be display signal normalized data that are obtained by normalizing display signal gamma data; in this case, the display signal normalized data can be first processed by gamma correction to obtain display signal data, and then the display signal data is further processed by the color gamut conversion unit 110. Moreover, for instance, the input signal may be the display signal data which are obtained from the display signal gamma data through normalization and gamma correction. In this case, the display signal data can be directly processed by the color gamut conversion unit 110. The specific form of the input signal for the color gamut conversion unit 110 is not limited in the embodiment of the present disclosure. The following embodiments are the same as this case. No further description will be given here.

For instance, in an example, FIG. 3 is a 2D plane chromaticity diagram illustrating the color gamut range displayed by a display device and the color gamut range of an input signal inputted into the display device. A triangle encircled by dotted lines in FIG. 3 represents the color gamut range displayed by the display device, and a triangle encircled by solid lines represents the color gamut range of the input signal inputted into the display device. For instance, the color gamut range of the input signal may be sRGB standard color gamut. As can be seen from FIG. 3, the color gamut range displayed by the display device covers the color gamut range of the input signal, namely the color gamut range that the display device can display is larger than the color gamut range covered by the input signal. For instance, if no color gamut conversion is performed, the display device conducts display operation according to the color gamut range of the display device when displaying the input signal. In this case, the display device cannot realize accurate color reproduction of the originally inputted input signal, so the displayed color is greatly different from the color in obtaining the input signal by an image taking device such as a camera.

Figure 4:
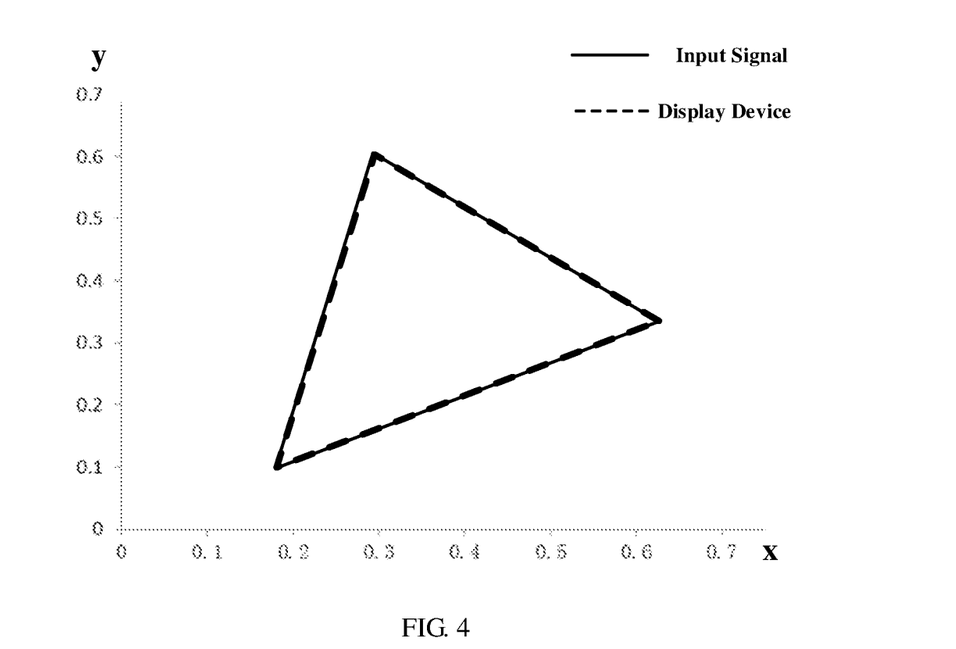
FIG. 4 is a 2D plane chromaticity diagram illustrating the color gamut range displayed by the display device as shown in FIG. 3 after the color gamut conversion.

For instance, the 2D plane chromaticity diagram as shown in FIG. 4 may be obtained by adoption of the image processing device 10 provided by the embodiment of the present disclosure to perform color gamut conversion on the color gamut range during the display operation by the display device as shown in FIG. 3. A triangle encircled by solid lines in FIG. 4 represents the color gamut range of the input signal inputted into the display device, and is consistent with that in FIG. 3. A triangle encircled by dotted lines in FIG. 4 represents the color gamut range displayed by the display device after color gamut conversion. As can be seen from FIG. 4, the color gamut range displayed by the display device is consistent with the color gamut range of the input signal.

As can be seen by comparing FIG. 3 and FIG. 4, after color gamut conversion, the display operation according to the color gamut range of the display device is converted into the display operation according to the color gamut range of the input signal when the display device displays the input signal.

The image processing device provided by the embodiment of the present disclosure can restore the color displayed by the display device to the original color of the input signal when the image processing device is applied to the display device, and then the true color of the image can be displayed by the display device and thus viewed by a user.

Figure 6:
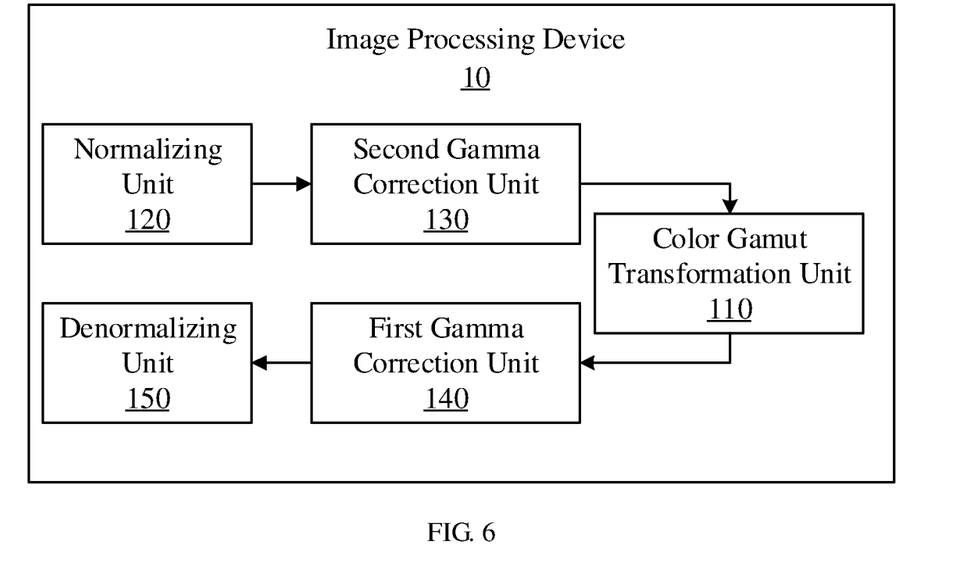
FIG. 6 is a schematic diagram of an image processing device provided by another example in an embodiment of the present disclosure.

For instance, in an example of the embodiment of the present disclosure, as shown in FIG. 6, the image processing device 10 may further comprise a normalizing unit 120, a second gamma correction unit 130, a first gamma correction unit 140 and a denormalizing unit 150.

When the display device displays the input signal, the displayed image information may be distorted due to the luminance nonlinearity of the display device, and the degree of distortion may be referred to as the gamma value of the display device. This kind of display distortion is caused by physical factors of the display device and is unavoidable, so the input signal must be subjected to compensation correction, namely gamma correction, on the front end of the display device. For instance, in a television system, gamma correction is completed in the process when a camera takes an image. The camera introduces an opposite nonlinear distortion, namely a camera gamma value, into the image signal obtained by the camera according to the luminance nonlinearity of the display device. For instance, the gamma value of a display device is 2.2. In order to realize the compensation correction of the nonlinear distortion of the display device, corresponding camera gamma value is 1/2.2=0.45.

For instance, when RGB (RGB color mode) signal data is taken as an input signal and inputted into a display device for display, at this point, the color gamut range displayed by the display device is still the color gamut range of the display device, and in this disclosure the RGB signal data, which is not subjected to color gamut conversion and displayed by the display device, is referred to as display signal gamma data, recorded as $(R_P, G_P, B_P)$. In this case, the color gamut range corresponding to the display signal gamma data is the color gamut range of the display device. For instance, as shown in FIG. 3, the color gamut range of the display device completely covers the color gamut range of the input signal and more area.

Moreover, for instance, the image processing device 10 is adopted for the processing of the color gamut conversion for the display signal gamma data, and in this disclosure the processed RGB signal data is referred to as transformed signal gamma data, recorded as $(R_S, G_S, B_S)$. In this case, the color gamut range when the display device displays the transformed signal gamma data is the color gamut range of the original input signal.

For instance, as described above, the display signal gamma data is generally subjected to gamma correction on a signal terminal before provided to the display device. For instance, the camera for taking an image performs gamma correction with the gamma value of e.g., 0.45 when obtaining the signal of the image. At this point, the display signal gamma data contains gamma information. Moreover, for instance, before the display signal gamma data is provided to the display device for display, the signal values that has been normalized to the range of 0-1 is denormalized into a grayscale brightness value. For instance, as for 8 bit data, correspondingly the grayscale brightness value is in the range of 0-255, namely 256 grayscale levels in total. Therefore, the display signal gamma data must be subjected to normalization and gamma correction before processing, so as to facilitate the subsequent data processing.

For instance, as shown in FIG. 6, the normalizing unit 120 is configured to obtain display signal normalized data by normalizing the display signal gamma data inputted into the image processing device 10, and the display signal normalized data is recorded as ($R_P^*$, $G_P^*$, $B_P^*$) herein.

For instance, in an example, the display signal gamma data is n-bit (n is an integer greater than 0) data; correspondingly, the value range is 0 to $2^n-1$; and the normalizing unit 120 is configured to normalize the display signal gamma data with the maximum being one (1). The normalized equations are as follows:

$$R_P^*=R_P/(2^n-1); G_P^*=G_P/(2^n-1); B_P^*=B_P/(2^n-1).$$

For instance, as shown in FIG. 6, the second gamma correction unit 130 is configured to obtain display signal data by conducting the second gamma correction on the display signal normalized data, and the display signal data is recorded as ($r_P$, $g_P$, $b_P$) herein. The second gamma correction equations are as follows:

$$r_P=(R_P^*)^\gamma; g_P=(G_P^*)^\gamma; b_P=(B_P^*)^\gamma.$$

For instance, in an example, when the display signal gamma data is subjected to the gamma correction with the gamma value of 0.45 at the signal terminal, the gamma value of the second gamma correction is 1/0.45=2.2, namely $\gamma$=2.2 in the second gamma correction equation. The display signal data obtained after second gamma correction does not contain gamma information and becomes linear signal data.

For instance, as shown in FIG. 6, the color gamut conversion unit 110 is configured to receive the display signal data and output transformed signal data, and the transformed signal data is recorded as ($r_S$, $g_S$, $b_S$) herein. The transformed signal data obtained after processing by the color gamut conversion unit 110 can be provided for the display device for display after further gamma correction and denormalization on the transformed signal data.

For instance, as shown in FIG. 6, the first gamma correction unit 140 is configured to obtain transformed signal normalized data by conducting the first gamma correction (which is inverse correction of the second gamma correction) on the transformed signal data, and the transformed signal normalized data is recorded as ($R_S^*$, $G_S^*$, $B_S^*$) herein. The first gamma correction equations are as follows:

$$R_S^*=r_S^{(1/\gamma)}; G_S^*=g_S^{(1/\gamma)}; B_S^*=b_S^{(1/\gamma)}.$$

For instance, in an example, as described above, when the gamma value $\gamma$ of the second gamma correction is 2.2, the gamma value of the first gamma correction, which is inverse correction of second gamma correction, is $1/\gamma=1/2.2=0.45$. The transformed signal normalized data obtained after first gamma correction contains gamma information again, and the nonlinearity of the display device is subjected to compensation correction, namely gamma correction. It should be noted that the description that the second gamma correction and the first gamma correction are mutual inverse correction indicates that: the gamma value of the second gamma correction and the gamma value of first gamma correction are mutually reciprocal.

For instance, as shown in FIG. 6, the denormalizing unit 150 is configured to obtain transformed signal gamma data by conducting the denormalization (which is inverse transformation of normalization) on the transformed signal normalized data, and transmit the transformed signal gamma data to the display device for display, and the transformed signal gamma data is recorded as ($R_S$, $G_S$, $B_S$) as described above. The denormalized equations are as follows:

$$R_S=R_S^*\times(2^n-1); G_S=G_S^*\times(2^n-1); B_S=B_S^*\times(2^n-1).$$

The denormalization of the denormalizing unit 150 and the normalization of the normalizing unit 120 are mutual inverse transformation. For instance, the maximum value of $2^n-1$ is normalized to the maximum value of 1 in the normalizing unit 120, and the maximum value of 1 is denormalized to the maximum value of $2^n-1$ in the denormalizing unit 150. The transformed signal gamma data obtained after processing by the denormalizing unit 150 is restored to the grayscale brightness value again, and can be transmitted to the display device for display. At this point, the color gamut range in the display operation by the display device is not the color gamut range of the display device again but the color gamut range of the input signal.

In an embodiment of the disclosure, the input signal that is inputted into the display device may be the display signal gamma data, the display signal normalized data, or display signal data.

In an example, the input signal may be display signal gamma data containing gamma correction information. In this case, the image processing device 10 includes the normalizing unit 120 and the second gamma correction unit 130, and can process display signal gamma data to obtain the display signal data by the normalizing unit 120 and the second gamma correction unit 130, and then further process the display signal data by the color gamut conversion unit 110 to realize the color gamut conversion for display.

In another example, the input signal can be display signal normalized data that are obtained by normalizing display signal gamma data; in this case, the image processing device 10 includes the second gamma correction unit 130 without the normalizing unit 120, and can process the display signal normalized data by the second gamma correction unit 130 to obtain display signal data, and then further process the display signal data by the color gamut conversion unit 110 to realize the color gamut conversion for display.

In still another example, the input signal may be the display signal data which are obtained from the display signal gamma data through normalization and gamma correction. In this case, the image processing device 10 includes the normalizing unit 120 and the second gamma correction unit 130, can directly process the display signal data by the color gamut conversion unit 110 to realize the color gamut conversion for display.

In addition, it should be noted that the color gamut conversion unit 110, the normalizing unit 120, the second gamma correction unit 130, the first gamma correction unit 140 and the denormalizing unit 150 in the image processing device 10 provided by the embodiment of the present disclosure may be all implemented by an application-specific integrated circuit (ASIC), hardware (circuit), firmware or any combination thereof, so as to realize the functions desired by each of the above-mentioned units, for instance, may be specifically implemented as a digital signal processor, etc.

Or the color gamut conversion unit 110, the normalizing unit 120, the second gamma correction unit 130, the first gamma correction unit 140 and the denormalizing unit 150 in the image processing device 10 may also be all implemented in the form including a processor and a memory. The memory is configured to store computer instructions capable to be executed by the processor, and the functions desired by each unit can be realized when the computer instructions are executed by the processor. No limitation will be given here in the embodiment of the present disclosure.

For instance, in an example of the embodiment of the present disclosure, the color gamut conversion unit 110 is configured to adopt a color gamut conversion matrix to realize color gamut conversion. The color gamut conversion matrix is as follows:

$$[M]=[A_S]\cdot[K_S]\cdot[K_P]^{-1}\cdot[A_P]^{-1}$$

in which [M] represents the color gamut conversion matrix; [$A_S$] refers to a transformation matrix for converting tristimulus values of the transformed signal data into corresponding chromaticity coordinate values; [$K_S$] refers to a coefficient matrix for normalizing the tristimulus values of the transformed signal data; [$A_P$] refers to a transformation matrix for converting tristimulus values of the display signal data into corresponding chromaticity coordinate values; and [$K_P$] refers to a coefficient matrix for normalizing the tristimulus values of the display signal data.

Description will be given below to the operations of the color gamut conversion matrix.

For instance, as shown in FIG. 6, the display signal data ($r_P$, $g_P$, $b_P$) is obtained after processing by the second gamma correction unit 130. The relational equation between the chromaticity coordinate values of the display signal data and the tristimulus values of the display signal data is as shown by the equation (1):

$$\begin{bmatrix} r_P \\ g_P \\ b_P \end{bmatrix} = [A_P] \cdot [K_P] \cdot \begin{bmatrix} X_P \\ Y_P \\ Z_P \end{bmatrix} = \begin{bmatrix} x_{RP} & y_{RP} & z_{RP} \\ x_{GP} & y_{GP} & z_{GP} \\ x_{BP} & y_{BP} & z_{BP} \end{bmatrix} \begin{bmatrix} K_{xP} & 0 & 0 \\ 0 & K_{yP} & 0 \\ 0 & 0 & K_{zP} \end{bmatrix} \cdot \begin{bmatrix} X_P \\ Y_P \\ Z_P \end{bmatrix} \quad (1)$$

It should be noted that: in the equation (1), $$\begin{bmatrix} r_P \\ g_P \\ b_P \end{bmatrix}$$

represents the chromaticity coordinate values of the display signal data, and $$\begin{bmatrix} X_P \\ Y_P \\ Z_P \end{bmatrix}$$

represents the tristimulus values of the display signal data.

The equation (1) is transformed to obtain the equation (2):

$$\begin{bmatrix} X_P \\ Y_P \\ Z_P \end{bmatrix} = [K_P]^{-1} \cdot [A_P]^{-1} \cdot \begin{bmatrix} r_P \\ g_P \\ b_P \end{bmatrix} \quad (2)$$

In the equation (1), $$[A_P] = \begin{bmatrix} x_{RP} & y_{RP} & z_{RP} \\ x_{GP} & y_{GP} & z_{GP} \\ x_{BP} & y_{BP} & z_{BP} \end{bmatrix},$$

wherein
[$A_P$] represents a transformation matrix for converting the tristimulus values of the display signal data into corresponding chromaticity coordinate value, namely the chromaticity coordinate value corresponding to the color gamut range of the display device. For instance, as shown in FIG. 3, ($x_{RP}$, $y_{RP}$), ($x_{GP}$, $y_{GP}$) and ($x_{BP}$, $y_{BP}$) are respectively the coordinates of three vertexes of the dotted-line triangle. For instance, in one specific example, the chromaticity coordinate value corresponding to the color gamut range of the display device can be obtained by colorimeter test. Moreover, as (x, y, z) in the chromaticity coordinate value satisfies x+y+z=1, $z_{RP}$, $z_{GP}$ and $z_{BP}$ can be obtained, namely [$A_P$] can be obtained by test and calculation.

In the equation (1), $$[K_P] = \begin{bmatrix} K_{xP} & 0 & 0 \\ 0 & K_{yP} & 0 \\ 0 & 0 & K_{zP} \end{bmatrix},$$

wherein
[$K_P$] represents a coefficient matrix for normalizing the tristimulus values of the display signal data. For instance, the normalizing condition may be that the right side of the equation (1) is $X_P=Y_P=Z_P=\frac{1}{3}$ when the left side of the equation (1) is the chromaticity coordinate value ($x_{WP}$, $y_{WP}$, $z_{WP}$) of white.

That is to say, as for a display device, [$A_P$] and [$K_P$] in the equation (1) can be obtained in advance by test and calculation.

Similarly, the relational equation between the chromaticity coordinate values of the transformed signal data and the tristimulus values of the transformed signal data is as shown by the equation (3):

$$\begin{bmatrix} r_S \\ g_S \\ b_S \end{bmatrix} = [A_S] \cdot [K_S] \cdot \begin{bmatrix} X_S \\ Y_S \\ Z_S \end{bmatrix} = \begin{bmatrix} x_{RS} & y_{RS} & z_{RS} \\ x_{GS} & y_{GS} & z_{GS} \\ x_{BS} & y_{BS} & z_{BS} \end{bmatrix} \cdot \begin{bmatrix} K_{xS} & 0 & 0 \\ 0 & K_{yS} & 0 \\ 0 & 0 & K_{zS} \end{bmatrix} \cdot \begin{bmatrix} X_S \\ Y_S \\ Z_S \end{bmatrix} \quad (3)$$

It should be noted that, in the equation (3), $$\begin{bmatrix} r_S \\ g_S \\ b_S \end{bmatrix}$$

represents the chromaticity coordinate values of the transformed signal data, and $$\begin{bmatrix} X_S \\ Y_S \\ Z_S \end{bmatrix}$$

represents the tristimulus values of the transformed signal data.

The equation (3) is transformed to obtain the equation (4):

$$\begin{bmatrix} X_S \\ Y_S \\ Z_S \end{bmatrix} = [K_S]^{-1} \cdot [A_S]^{-1} \cdot \begin{bmatrix} r_S \\ g_S \\ b_S \end{bmatrix} \quad (4)$$

In the equation (3), $$[A_S] = \begin{bmatrix} x_{RS} & y_{RS} & z_{RS} \\ x_{GS} & y_{GS} & z_{GS} \\ x_{BS} & y_{BS} & z_{BS} \end{bmatrix},$$

$[A_S]$ represents a transformation matrix for converting the tristimulus values of the transformed signal data into corresponding chromaticity coordinate value, namely the chromaticity coordinate value corresponding to the color gamut range of the input signal. For instance, as shown in FIG. 3, $(x_{RS}, y_{RS})$, $(x_{GS}, y_{GS})$ and $(x_{BS}, y_{BS})$ are respectively the coordinates of three vertexes of the solid-line triangle. For instance, in one specific example, the color gamut of the input signal may adopt sRGB standard color gamut, and the chromaticity coordinate values corresponding to the color gamut range are currently known, as shown by the table 1. Meanwhile, the chromaticity coordinate values corresponding to Adobe RGB standard color gamut and NTSC standard color gamut are also shown in the table 1. When the color gamut of the input signal adopts sRGB standard color gamut as seen from the table 1, $(x_{RS}, y_{RS})=(0.64, 0.33)$, $(x_{GS}, y_{GS})=(0.3, 0.6)$ and $(x_{BS}, y_{BS})=(0.15, 0.06)$. Moreover, as (x, y, z) in the chromaticity coordinate value satisfies $x+y+z=1$, $z_{RS}$, $z_{GS}$ and $z_{BS}$ can be obtained, and then $[A_S]$ is obtained.

TABLE 1

| Standard Name | | sRGB | NTSC | Adobe RGB |
|---|---|---|---|---|
| R | x | 0.64 | 0.67 | 0.64 |
|  | y | 0.33 | 0.33 | 0.33 |
|  | z | 0.03 | 0.00 | 0.03 |
| G | x | 0.30 | 0.21 | 0.21 |
|  | y | 0.60 | 0.71 | 0.71 |
|  | z | 0.10 | 0.08 | 0.08 |
| B | x | 0.15 | 0.14 | 0.15 |
|  | y | 0.06 | 0.08 | 0.06 |
|  | z | 0.79 | 0.78 | 0.79 |
| W | x | 0.3127 | 0.3127 | 0.3127 |
|  | y | 0.3290 | 0.3290 | 0.3290 |
|  | z | 0.3583 | 0.3583 | 0.3583 |

In the equation (3), $$[K_S] = \begin{bmatrix} K_{xS} & 0 & 0 \\ 0 & K_{yS} & 0 \\ 0 & 0 & K_{zS} \end{bmatrix},$$

$[K_S]$ represents a coefficient matrix for normalizing the tristimulus values of the transformed signal data. For instance, the normalizing condition may be that the right side of the equation (3) is $X_S=Y_S=Z_S=\frac{1}{3}$ when the left side of the equation (3) is the chromaticity coordinate value $(x_{WS}, y_{WS}, z_{WS})$ of white.

That is to say, as for an input signal, $[A_S]$ and $[K_S]$ in the equation (3) can be obtained in advance by calculation according to known standard color gamut.

It should be noted that in the embodiment of the present disclosure, the color gamut range of the input signal includes standard color gamut, e.g., sRGB color gamut, adobe RGB color gamut or P3color gamut. However, the embodiments of the present disclosure are not limited to these standard color gamuts. For instance, the color gamut range of the input signal may also not adopt a standard color gamut. In this case, the chromaticity coordinate value corresponding to the color gamut range of the input signal must be obtained in advance and then taken as $[A_S]$ in the color gamut conversion matrix.

In order to maintain the consistency between the color gamut range displayed by the display device and the color gamut range of the input signal, the color stimulus coordinate of the display signal data may be equal to the color stimulus coordinate of the transformed signal data. That is to say, the equation (5) is obtained from $$\begin{bmatrix} r_S \\ g_S \\ b_S \end{bmatrix} = [A_S] \cdot [K_S] \cdot [K_P]^{-1} \cdot [A_P]^{-1} \cdot \begin{bmatrix} r_P \\ g_P \\ b_P \end{bmatrix} \quad (6)$$

The equation (5) may be transformed to obtain the equation (6):

$$\begin{bmatrix} X_S \\ Y_S \\ Z_S \end{bmatrix} = \begin{bmatrix} X_P \\ Y_P \\ Z_P \end{bmatrix}; \quad (5)$$

$$[K_S]^{-1} \cdot [A_S]^{-1} \cdot \begin{bmatrix} r_S \\ g_S \\ b_S \end{bmatrix} = [K_P]^{-1} \cdot [A_P]^{-1} \cdot \begin{bmatrix} r_P \\ g_P \\ b_P \end{bmatrix}$$

The color gamut conversion matrix $[M]$ may be obtained from the equation (6) and is as follows:

$$[M]=[A_S] \cdot [K_S] \cdot [K_P]^{-1} \cdot [A_P]^{-1}$$

As described above, the color gamut conversion matrix may be obtained by the following operations:

obtaining a relational equation between the chromaticity coordinate values of the display signal data and the tristimulus values of the display signal data;

obtaining a relational equation between the chromaticity coordinate values of the transformed signal data and the tristimulus values of the transformed signal data; and allowing the tristimulus values of the display signal data to be equal to the tristimulus values of the transformed signal data.

Figure 7:
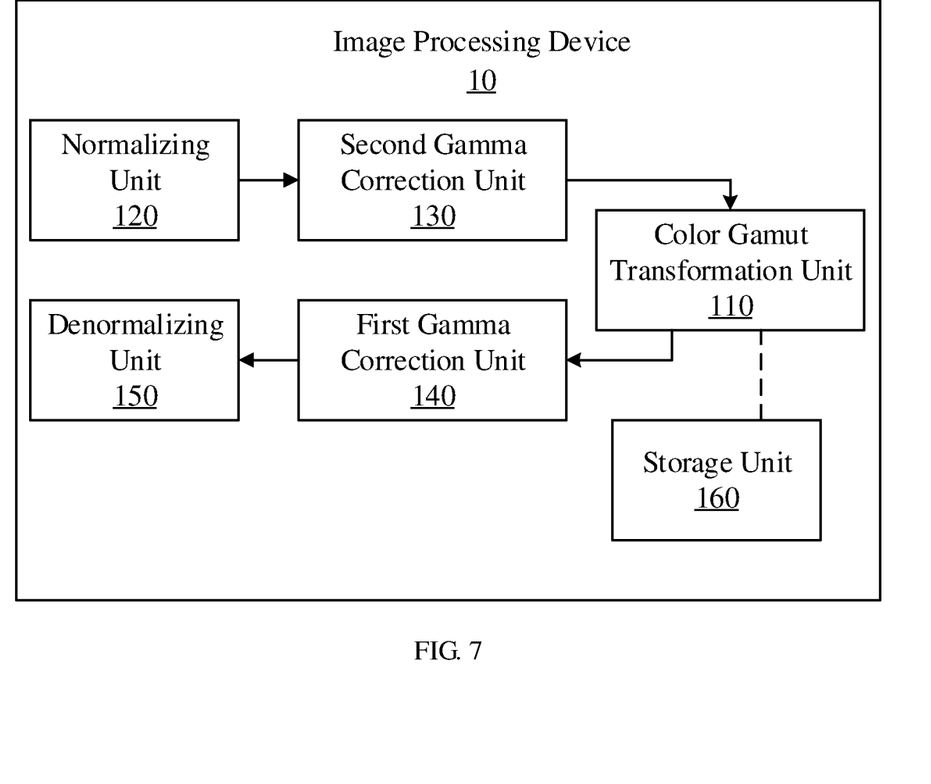
FIG. 7 is a schematic diagram of an image processing device provided by another example in an embodiment of the present disclosure.

For instance, in an example of the embodiment of the present disclosure, as shown in FIG. 7, the image processing device 10 may further comprise a storage unit 160. For instance, the color gamut conversion matrix may be stored into the storage unit 160. When the color gamut conversion unit 110 needs to use the color gamut conversion matrix, the color gamut conversion matrix is only required to be directly called from the storage unit 160 and is not required to be calculated each time. For instance, the storage unit 160 may be specifically implemented as a storage medium in any appropriate form.

The image processing device 10 provided by the embodiment of the present disclosure may restore the color displayed by the display device to the original color of the input signal of an image when the image processing device 10 is applied to the display device, and then can display the true color of the input signal of the image. For instance, the image processing device 10 may restore the image color displayed by a medical display device into the true color of the human tissue structure when the image processing device 10 is applied to the medical display device, so that the doctor can better carry out medical work.

An embodiment of the present disclosure further provides an image processing method, which comprises the following operations.

S110: performing processing on an input signal inputted into a display device, so that the display operation according to the color gamut range of the display device can be converted into the display operation according to the color gamut range of the input signal when the display device displays the input signal.

In an embodiment of the disclosure, the input signal that is inputted into the display device includes the display signal gamma data, the display signal normalized data, or display signal data. The description of the input signal can be correspondingly referred to the above description of the image processing device 10, and no repeated description is given here.

For instance, step S110 may be executed by adoption of the color gamut conversion unit 110 as shown in FIG. 5.

For instance, in an example, FIG. 3 is a 2D plane chromaticity diagram illustrating the color gamut range displayed by a display device and the color gamut range of an input signal inputted into the display device. A triangle encircled by dotted lines in FIG. 3 represents the color gamut range displayed by the display device, and a triangle encircled by solid lines represents the color gamut range of the input signal inputted into the display device. For instance, the color gamut range of the input signal may be sRGB standard color gamut. As can be seen from FIG. 3, the color gamut range displayed by the display device covers the color gamut range of the input signal, namely the color gamut range that the display device can display is larger than the color gamut range covered by the input signal. For instance, if no color gamut conversion is performed, the display device can conduct display operation according to the color gamut range of the display device when displaying the input signal. In this case, the display device cannot realize accurate color reproduction of the originally inputted input signal, so the displayed color is greatly different from the color in obtaining the input signal by an image taking device such as a camera.

For instance, the 2D plane chromaticity diagram as shown in FIG. 4 may be obtained by adoption of the image processing method provided by the embodiment of the present disclosure to perform color gamut conversion on the color gamut range displayed by the display device as shown in FIG. 3. A triangle encircled by solid lines in FIG. 4 represents the color gamut range of the input signal inputted into the display device, and is consistent with that in FIG. 3. A triangle encircled by dotted lines in FIG. 4 represents the color gamut range displayed by the display device after color gamut conversion. As can be seen from FIG. 4, the color gamut range displayed by the display device is consistent with the color gamut range of the input signal.

As can be seen by comparing FIG. 3 and FIG. 4, after color gamut conversion, the display operation according to the color gamut range of the display device is converted into the display operation according to the color gamut range of the input signal when the display device displays the input signal.

The image processing method provided by the embodiment of the present disclosure can restore the color displayed by the display device to the original color of the input signal when the image processing method is applied to the display device, and then the display device can display the true color of the image.

Figure 8:
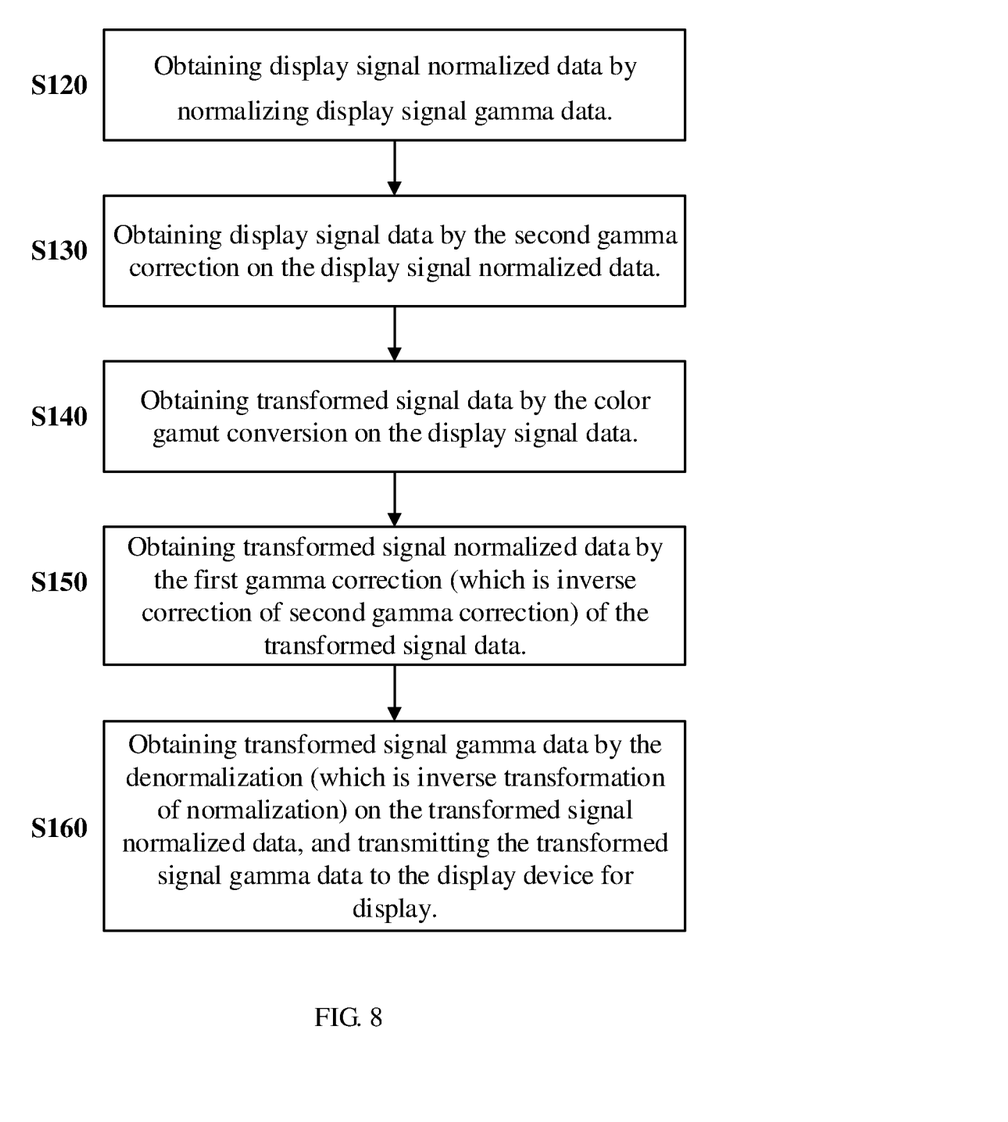
FIG. 8 is a schematic diagram of an image processing method provided by an example in an embodiment of the present disclosure.

For instance, as shown in FIG. 8, in an example of the embodiment of the present disclosure, the image processing method may further comprise the following operations:

S120: obtaining display signal normalized data by normalizing display signal gamma data;

S130: obtaining display signal data by the second gamma correction on the display signal normalized data;

S140: obtaining transformed signal data by the color gamut conversion on the display signal data;

S150: obtaining transformed signal normalized data by the first gamma correction (which is inverse correction of second gamma correction) of the transformed signal data; and S160: obtaining transformed signal gamma data by the denormalization (which is inverse transformation of normalization) on the transformed signal normalized data, and transmitting the transformed signal gamma data to the display device for display.

For instance, the gamma value of the second gamma correction in step S130 and the gamma value of the first gamma correction in step S150 are mutually reciprocal.

For instance, as shown in FIG. 6, step S120 may be executed by adoption of the normalizing unit 120, so as to obtain the display signal normalized data $(R_P^*, G_P^*, B_P^*)$ by normalizing the display signal gamma data $(R_P, G_P, B_P)$.

For instance, as shown in FIG. 6, step S130 may be executed by adoption of the second gamma correction unit 130, so as to obtain the display signal data $(r_P, g_P, b_P)$ by the second gamma correction on the display signal normalized data $(R_P^*, G_P^*, B_P^*)$ by the second gamma correction unit 130. At this point, the display signal data does not contain gamma information and is linear signal data. For example, the second gamma correction is conducted with the gamma value of 2.2.

For instance, as shown in FIG. 6, step S140 may be executed by adoption of the color gamut conversion unit 110, so as to obtain the transformed signal data $(r_S, g_S, b_S)$ by the color gamut conversion on the display signal data $(r_P, g_P, b_P)$ by the color gamut conversion unit 110.

For instance, as shown in FIG. 6, step S150 may be executed by adoption of the first gamma correction unit 140, so as to obtain the transformed signal normalized data $(R_S^*, G_S^*, B_S^*)$ by the first gamma correction of the transformed signal data $(r_S, g_S, b_S)$ by the first gamma correction unit 140.

The transformed signal normalized data contains gamma information, and the nonlinearity of the display device is subjected to compensation correction, namely gamma correction.

For instance, as shown in FIG. 6, step S160 may be executed by adoption of the denormalizing unit 150, so as to obtain the transformed signal gamma data ($R_S$, $G_S$, $B_S$) by the denormalization (which is inverse transformation of normalization in step S120) on the transformed signal normalized data ($R_S^*$, $G_S^*$, $B_S^*$) by the denormalizing unit 150. The transformed signal gamma data is restored to the grayscale brightness value and can be transmitted to the display device for display.

It should be noted that detailed description in steps S120, S130, S140, S150 and S160 may refer to corresponding description in the above embodiment of the image processing device 10. No further repeated description will be given here.

In an example, the input signal may be display signal gamma data containing gamma correction information. In this case, the image processing method includes step 120 and step 130, and can process display signal gamma data to obtain the display signal data by step 120 and step 130, and then further process the display signal data by step 140 to realize the color gamut conversion for display.

In another example, the input signal can be display signal normalized data that are obtained by normalizing display signal gamma data; in this case, the image processing method includes step 130 without step 120, and can process the display signal normalized data by step 130 to obtain display signal data, and then further process the display signal data by step 140 to realize the color gamut conversion for display.

In still another example, the input signal may be the display signal data which are obtained from the display signal gamma data through normalization and gamma correction. In this case, the image processing method includes step 120 and step 130, can directly process the display signal data by step 140 to realize the color gamut conversion for display.

For instance, in an example of the embodiment of the present disclosure, the color gamut conversion in step S140 may be configured to adopt the color gamut conversion matrix to realize color gamut conversion. The color gamut conversion matrix is as follows:

$$[M]=[A_S]\cdot[K_S][K_P]^{-1}\cdot[A_P]^{-1}$$

wherein [M] represents the color gamut conversion matrix; [$A_S$] refers to a transformation matrix for converting tristimulus values of the transformed signal data into corresponding chromaticity coordinate values; [$K_S$] refers to a coefficient matrix for normalizing the tristimulus values of the transformed signal data; [$A_P$] refers to a transformation matrix for converting tristimulus values of the display signal data into corresponding chromaticity coordinate values; and [$K_P$] refers to a coefficient matrix for normalizing the tristimulus values of the display signal data.

Detailed description on the color gamut conversion matrix may refer to corresponding description in the above embodiment of the image processing device 10. No further description will be given here.

Figure 9:
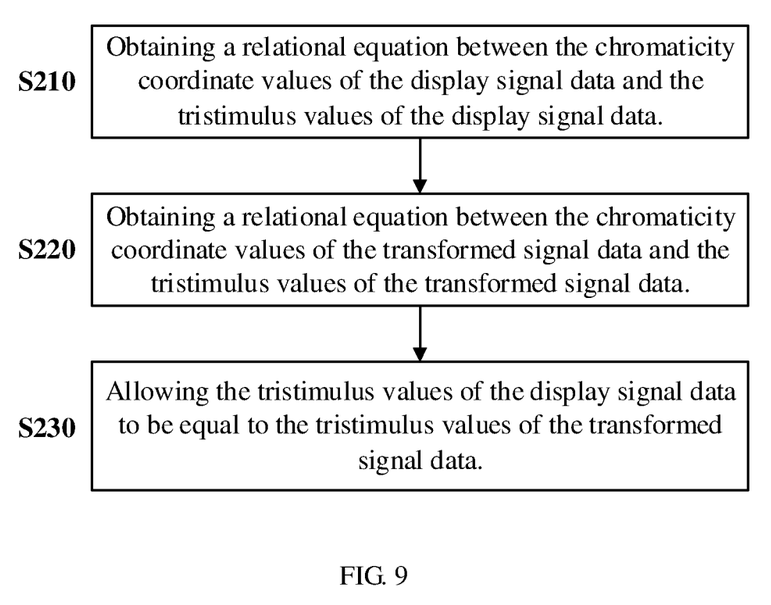
FIG. 9 is a schematic diagram of an operation method for obtaining a color gamut conversion matrix, provided by an embodiment of the present disclosure.

For instance, in an example of the embodiment of the present disclosure, as shown in FIG. 9, the color gamut conversion matrix may be obtained by the following operations:

S210: obtaining a relational equation between the chromaticity coordinate values of the display signal data and the tristimulus values of the display signal data;

S220: obtaining a relational equation between the chromaticity coordinate values of the transformed signal data and the tristimulus values of the transformed signal data; and S230: allowing the tristimulus values of the display signal data to be equal to the tristimulus values of the transformed signal data.

Detailed description on steps S210, S220 and S230 may refer to corresponding description in the above embodiment of the image processing device 10. No further repeated description will be given here.

For instance, in an example of the embodiment of the present disclosure, the image processing method may further comprise: determining whether the color gamut range of the display device is greater than the color gamut range of the input signal, and executing color gamut conversion in a case where the color gamut range of the display device is greater than the color gamut range of the input signal.

For instance, in the process of executing the image processing method as shown in FIG. 8, whether the color gamut range of the display device is greater than the color gamut range of the input signal may be determined at first. For instance, in an example, as shown in FIG. 3, the color gamut range of the display device is greater than the color gamut range of the input signal, and at this point, the image processing method provided by the embodiment of the present disclosure may be adopted to perform color gamut conversion on the color gamut range displayed by the display device.

For instance, in the image processing method of an embodiment of the present disclosure, the color gamut range of the input signal is standard color gamut; and the standard color gamut includes sRGB color gamut, adobe RGB color gamut or P3 color gamut.

For instance, in an example of the embodiment of the present disclosure, the color gamut conversion matrix is stored in the storage unit. For example, in the process of step S140, the color gamut conversion matrix is only required to be directly called from the storage unit 160 and is not required to be calculated each time.

The image processing method provided by the embodiment of the present disclosure can restore the color displayed by the display device to the original color of the input signal when the image processing method is applied to the display device, and then the display device can display the true color of the image. For instance, the image processing device may restore the image color displayed by a medical display device to the true color of the human tissue structure when the image processing method is applied to the medical display device, so that the doctor can better carry out medical work.

Figure 10:
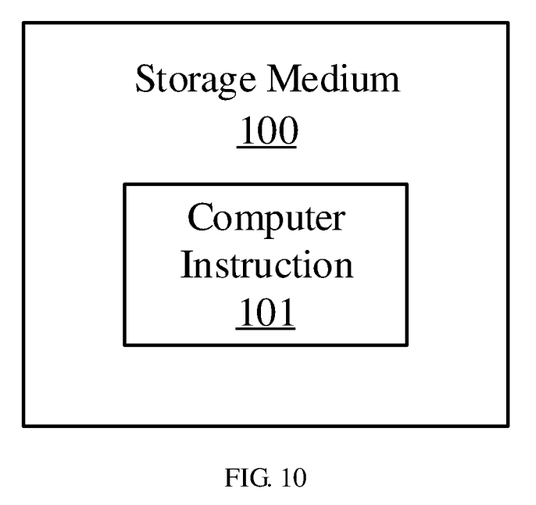
FIG. 10 is a schematic diagram of a storage medium provided by an embodiment of the present disclosure.

An embodiment of the present disclosure further provides a storage medium 100. As shown in FIG. 10, computer instructions 101 capable to be executed by a processor are stored on the storage medium 100, and the image processing method provided by the embodiment of the present disclosure may be implemented when the computer instructions 101 are executed by the processor.

For instance, in an example, the storage medium 100 may be arranged in a computing device, and the computing device may be configured to be connected with a display device. For instance, the computing device may further comprise a processor. The processor may call the computer instructions 101 stored in the storage medium 100, so as to implement the image processing method provided by the embodiment of the present disclosure.

Figure 11:
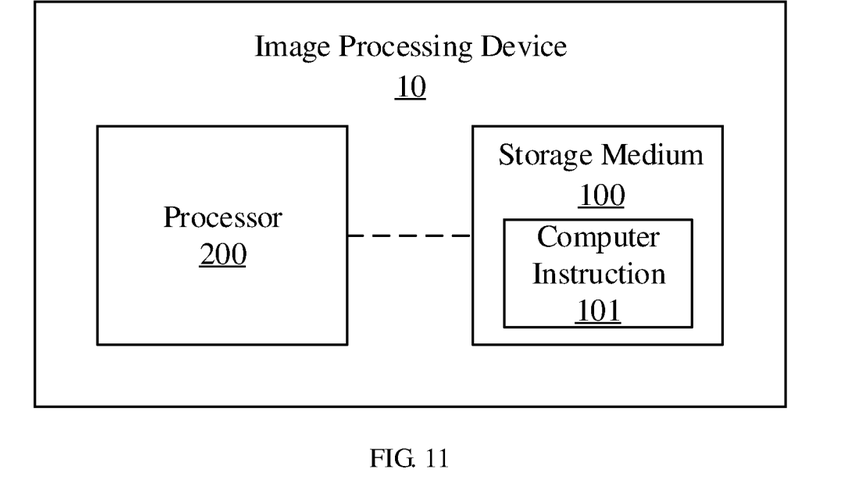
FIG. 11 is a schematic diagram of an image processing device provided by another embodiment of the present disclosure.

An embodiment of the present disclosure further provides an image processing device 10. As shown in FIG. 11, the image processing device 10 comprises a processor 200 and a storage medium 100. Computer instructions 101 capable to be executed by the processor 200 are stored on the storage medium 100, and the image processing method provided by the embodiment of the present disclosure may be implemented when the computer instructions 101 are executed by the processor 200.

In the embodiments of the present disclosure, the processor may be implemented by an ASIC chip. For instance, the ASIC chip may be arranged on a motherboard. For instance, a memory, a power supply circuit and the like may also be disposed on the motherboard. The processor may also be implemented by a circuit, software, hardware (circuit), firmware or any combination thereof. In the embodiment of the present disclosure, the processor may include various kinds of computation structures, e.g., a complex instruction set computer (CISC) structure, a reduced instruction set computer (RISC) structure or a structure for implementing a combination of multiple instruction sets. In some embodiments, the processor may also be a microprocessor, e.g., an X86 processor or an ARM processor, or may be a digital signal processor (DSP), etc.

In the embodiment of the present disclosure, the storage medium, for instance, may be arranged on the motherboard, and may store instructions and/or data executed by the processor. For instance, the memory may include one or more computer program products. The computer program products may include various kinds of computer readable memories such as a volatile memory and/or a nonvolatile memory. The volatile memory, for instance, may include a random access memory (RAM) and/or a cache. The nonvolatile memory, for instance, may include a read only memory (ROM), a hard disk, a flash memory, etc. One or more computer program instructions may be stored on the computer readable memory. The processor can run the program instructions, so as to realize the desired functions (implemented by the processor) in the embodiment of the present disclosure.

Figure 12:
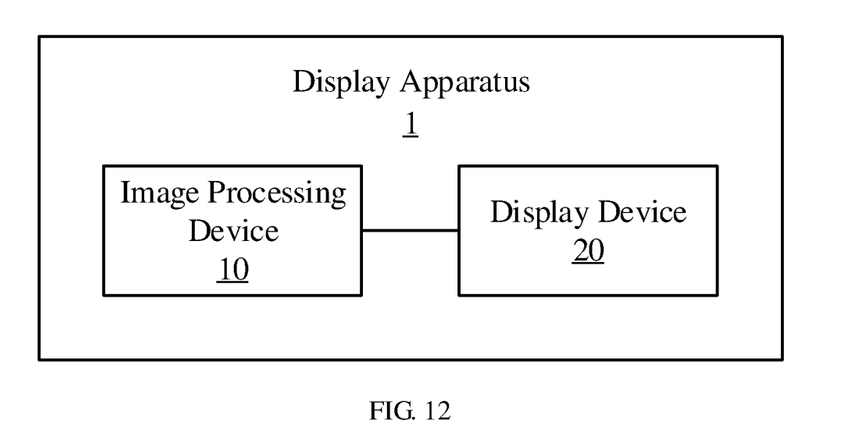
FIG. 12 is a schematic diagram of a display device provided by an embodiment of the present disclosure.

An embodiment of the present disclosure further provides a display apparatus 1. As shown in FIG. 12, the display apparatus 1 comprises the image processing device 10 provided by any one embodiment of the present disclosure and a display device 20. The display device 20 receives a processing result outputted by the image processing device 10, and may be various kinds of display devices, e.g., a liquid crystal display (LCD) device, an organic light-emitting diode (OLED) display device, a cathode ray tube (CRT) display device, or a plasma display device.

For instance, in an example, the image processing device 10 may be integrated into the display device 20, so as to perform color gamut conversion on the color gamut range displayed by a display signal inputted into the display device 20.

The display apparatus 1 provided by the embodiment of the present disclosure may restore the displayed color by the display device to the original color of the input signal of an image, and then can display the true color of the image.

For instance, the display apparatus 1 provided by the embodiment of the present disclosure may be: a product or component with display function such as a mobile phone, a tablet PC, a TV, a display or a notebook computer.

What are described above is related to the illustrative embodiments of the disclosure only and not limitative to the scope of the disclosure; the scopes of the disclosure are defined by the accompanying claims.

What is claimed is:

1. An image processing device for a display device, comprising a color gamut converter, a first gamma corrector and a denormalizer, a second gamma corrector, a normalizer,
wherein the color gamut converter is configured to perform processing on an input signal inputted into the display device to allow a display operation according to a color gamut range of the display device to be converted into a display operation according to a color gamut range of the input signal when the display device displays the input signal, so that the color gamut range of the display device is consistent with the color gamut range of the input signal;
the color gamut converter is further configured to receive display signal data obtained from the input signal and output transformed signal data by normalization and second gamma correction;
the first gamma corrector is configured to obtain transformed signal normalized data by first gamma correction, which is inverse correction of second gamma correction, on the transformed signal data;
the denormalizer is configured to obtain transformed signal gamma data by denormalization, which is inverse transformation of the normalization, of the transformed signal normalized data, and transmit the transformed signal gamma data to the display device for display;
the second gamma corrector is configured to obtain the display signal data by the second gamma correction on display signal normalized data obtained from the input signal by the normalization;
a gamma value of the second gamma correction and a gamma value of the first gamma correction are mutually reciprocal; and
the normalizer is configured to obtain the display signal normalized data by the normalization on display signal gamma data as the input signal inputted into the image processing device;
wherein the color gamut converter is configured to adopt a color gamut conversion matrix to realize color gamut conversion, and the color gamut conversion matrix is as follows:

$$[M]=[A_S] \cdot [K_S] \cdot [K_P]^{-1} \cdot [A_P]^{-1}$$

in which [M] refers to the color gamut conversion matrix; [$A_S$] refers to a transformation matrix for converting tristimulus values of the transformed signal data into corresponding chromaticity coordinate values; [$K_S$] refers to a coefficient matrix for normalizing the tristimulus values of the transformed signal data; [$A_P$] refers to a transformation matrix for converting tristimulus values of the display signal data into corresponding chromaticity coordinate values; and [$K_P$] refers to a coefficient matrix for normalizing the tristimulus values of the display signal data.

2. The image processing device according to claim 1, wherein the color gamut converter is further configured to obtain the color gamut conversion matrix by following operations:
obtaining a relational equation between the chromaticity coordinate values of the display signal data and the tristimulus values of the display signal data;
obtaining a relational equation between the chromaticity coordinate values of the transformed signal data and the tristimulus values of the transformed signal data; and allowing the tristimulus values of the display signal data to be equal to the tristimulus values of the transformed signal data.

3. The image processing device according to claim 1, further comprising a storage, wherein the color gamut conversion matrix is stored in the storage.

4. The image processing device according to claim 1, wherein the color gamut range of the input signal is standard color gamut; and the standard color gamut includes sRGB color gamut, adobe RGB color gamut or P3 color gamut.

5. A display apparatus, comprising the image processing device according to claim 1 and a display device, wherein the display device is configured to receive a processing result outputted by the image processing device for display.

6. The image processing device according to claim 1, wherein the color gamut range of the input signal, on which is not performed processing by the color gamut converter, is less than the color gamut range of the display device.

7. The image processing device according to claim 1, wherein the gamma value of the second gamma correction is 2.2.

8. An image processing method, comprising:
   performing processing on an input signal inputted into a display device so as to convert a display operation according to a color gamut range of the display device into a display operation according to a color gamut range of the input signal when the display device displays the input signal, so that the color gamut range of the display device is consistent with the color gamut range of the input signal;
   obtaining transformed signal data by color gamut conversion on display signal data obtained from the input signal by normalization and second gamma correction;
   obtaining transformed signal normalized data by first gamma correction, which is inverse correction of the second gamma correction, of the transformed signal data; and
   obtaining transformed signal gamma data by denormalization, which is inverse transformation of the normalization, of the transformed signal normalized data, and transmitting the transformed signal gamma data to the display device for display;
   obtaining the display signal data by the second gamma correction on display signal normalized data obtained from the input signal by the normalization;
   obtaining the display signal normalized data by the normalization on display signal gamma data which are inputted into the display device as the input signal,
   wherein a gamma value of the second gamma correction and a gamma value of the first gamma correction are mutually reciprocal;
   the color gamut conversion is realized by color gamut conversion matrix, and the color gamut conversion matrix is as follows:

$[M]=[A_S] \cdot [K_S] \cdot [K_P]^{-1} \cdot [A_P]^{-1}$ in which [M] refers to the color gamut conversion matrix; $[A_S]$ refers to a transformation matrix for converting tristimulus values of the transformed signal data into corresponding chromaticity coordinate values; $[K_S]$ refers to a coefficient matrix for normalizing the tristimulus values of the transformed signal data; $[A_P]$ refers to a transformation matrix for converting tristimulus values of the display signal data into corresponding chromaticity coordinate values; and $[K_P]$ refers to a coefficient matrix for normalizing the tristimulus values of the display signal data.

9. The image processing method according to claim 8, wherein the color gamut conversion matrix is obtained by the following operations:
   obtaining a relational equation between the chromaticity coordinate values of the display signal data and the tristimulus values of the display signal data;
   obtaining a relational equation between the chromaticity coordinate values of the transformed signal data and the tristimulus values of the transformed signal data; and
   allowing the tristimulus values of the display signal data to be equal to the tristimulus values of the transformed signal data.

10. The image processing method according to claim 8, further comprising:
    determining whether the color gamut range of the display device is greater than the color gamut range of the input signal, and executing the color gamut conversion in a case where the color gamut range of the display device is greater than the color gamut range of the input signal.

11. A nonvolatile storage medium, wherein computer instructions that are capable to be executed by a processor are stored on the nonvolatile storage medium; and the image processing method according to claim 8 is implemented when the computer instructions are executed by the processor.

12. An image processing device, comprising a processor and a nonvolatile storage medium,
    wherein computer instructions that are capable to be executed by the processor are stored on the nonvolatile storage medium; and the image processing method according to claim 8 is implemented when the computer instructions are executed by the processor.

13. The image processing method according to claim 8, wherein the color gamut range of the input signal, on which is not performed processing by the color gamut converter, is less than the color gamut range of the display device.

14. The image processing method according to claim 8, wherein the gamma value of the second gamma correction is 2.2.

\* \* \* \* \*